(12) United States Patent
Preuss (10) Patent No.: US 6,973,403 B1
(45) Date of Patent: Dec. 6, 2005

(54) METHOD AND SYSTEM FOR IDENTIFICATION OF SYSTEM RESPONSE PARAMETERS FOR FINITE IMPULSE RESPONSE SYSTEMS

(75) Inventor: Robert David Preuss, Sagamore Beach, MA (US)

(73) Assignee: Bent Solutions LLC, Cambridge, MA (US)

(*) Notice: Subject to any disclaimer, the term of this patent is extended or adjusted under 35 U.S.C. 154(b) by 185 days.

(21) Appl. No.: 10/440,389

(22) Filed: May 16, 2003

(51) Int. Cl.[7] .......................................... G06F 17/14
(52) U.S. Cl. ....................... 702/109; 702/77; 702/190; 708/300; 708/405
(58) Field of Search .......................... 702/109, 66, 69, 702/75–77, 124, 126, 79, 176, 178, 183, 702/189, 190, 197, 194; 708/300, 306, 309, 708/311, 405, 422, 426, 813, 819, 821, 403, 708/404; 324/76.21, 76.28, 76.29, 76.33, 324/76.68; 381/718; 375/355; 379/22.02

(56) References Cited

U.S. PATENT DOCUMENTS

| | | | |
|---|---|---|---|
| 5,347,586 A * | 9/1994 | Hill et al. .................. 381/71.8 |
| 5,796,849 A * | 8/1998 | Coleman et al. ........... 381/71.8 |
| 5,991,348 A * | 11/1999 | Alelyunas et al. .......... 375/355 |
| 6,701,335 B2 * | 3/2004 | Pupalaikis .................. 708/300 |
| 2002/0126803 A1 * | 9/2002 | Jones et al. ............. 379/22.02 |

* cited by examiner

Primary Examiner—Hal Wachsman (74) Attorney, Agent, or Firm—Ropes & Gray LLP (57) ABSTRACT

Methods and systems for determining characteristics of a Finite Impulse Response system that can include applying a number of identical sets of probe signals to the system and averaging the observed outputs. A discrete Fourier transform (DFT) of the averaged outputs can be obtained and the DFT components can be multiplied by corresponding transformed companion components related to the probe components. The system characteristics can be selected based on computing the inverse DFT of the resulting product components. The probe components can be taken from a circulant matrix of size S×S, or from an inverse DFT of a set of transform components consisting of arbitrary, non-zero, real numbers for first and last components of a partial set and arbitrary, non-zero, complex numbers for other components of the partial set to which the non-zero, complex number components of the partial set are added in reverse order and in complex conjugate.

31 Claims, 3 Drawing Sheets

METHOD AND SYSTEM FOR IDENTIFICATION OF SYSTEM RESPONSE PARAMETERS FOR FINITE IMPULSE RESPONSE SYSTEMS

REFERENCE TO GOVERNMENT FUNDING

The U.S. Government has a paid-up license in this invention and the right in limited circumstances to require the patent owner to license to others on reasonable terms as provided for by the terms of Contract No. N00024-91-C-4355 awarded by the Naval Sea Systems Command.

RELATED APPLICATIONS

There are no related applications.

FIELD OF THE INVENTION

The methods and systems relate to identifying system parameters, and more particularly to methods and systems for identifying parameters in Finite Impulse Response (FIR) systems.

BACKGROUND

Mathematical models of systems can be used in a wide variety of disciplines. These mathematical models can be used to predict how a system will react in different environments and can be used to improve the system. One approach to mathematical modeling may be known as "white box" modeling. In this approach, the laws governing a system are represented mathematically. For example, for a physical system, the law of gravity may be represented in the model. The outputs of the system may be determined by applying the mathematical model to the inputs. Sometimes, however, system behavior is too complex to be easily modeled using the "white box" approach.

Another approach to mathematical modeling may be known as system identification (SysId). System identification may include mathematical modeling of systems from experimental data and may be applied in many engineering areas, e.g., communications, mechanical engineering, or geophysical engineering for purposes such as spectral analysis, fault detection, adaptive filtering, linear prediction, and pattern recognition. SysId techniques may also find application in fields such as biology, environmental sciences and econometrics. In SysId, a system can be treated as a black box, i.e., inputs can be applied to an unknown system, and a corresponding (noise corrupted) output signal from that system can be observed. These input and output signals may then be used, together with a mathematical model of the system, to estimate the model parameters that best characterize the system. When the system has M input channels, traditionally one may repeat the experiment M times with a different input channel selected to be active for each repetition. Additionally, traditional methods may involve inputting one or more sets of input probe signals and observing the respective output signals. Auto-correlations among the probe signals and cross correlations between the input and output signals may then be computed and used to solve a linear system of equations to determine the system coefficients, or parameters.

The need to solve a linear system of equations can be expensive, in terms of computations. As such, there is a need for computationally efficient methods and systems that eliminate the need to solve a linear system of equations.

SUMMARY OF THE INVENTION

Accordingly, the present invention is directed to methods, systems and/or computer programs that obviate the above and other disadvantages of the prior art. In general, methods, systems and/or computer programs disposed on a computer readable medium can determine characteristics of a Finite Impulse Response (FIR) system having $M \geq 1$ inputs and a response duration $T \geq 1$, by: determining a snapshot having a duration S at least equal to a multiple D of the number of inputs, the multiple D being at least equal to the response duration of the system; determining a number of identical sets of probe signals having probe components taken from a sequence of length S; applying at least one of the sets to the system to obtain output signals; obtaining transformed companion components related to the probe components; obtaining a correlation estimate based on components of the output signals and the transformed companion components; and selecting the characteristics from the correlation estimate.

In one embodiment, the output signals can be averaged over the number of sets of probe signals applied so as to obtain averaged output signals and the correlation estimates can be obtained based on the averaged output signals. In another embodiment, the transformed companion components can be obtained as an inverse of the components of a discrete Fourier transform (DFT) of the sequence of length S. The correlation estimate can be obtained by multiplying corresponding components of a DFT of components of the output signals and the transformed companion components to obtain product components and computing the inverse DFT of the product components.

A preamble sequence of a size equal to the multiple D can be attached to a first of the sets of probe signals or can be attached to each set of probe signals. The preamble sequence can be defined such that the probe components of the preamble correspond to the D last components of one of the sets of probe signals. In one embodiment, a designated probe component m of an $n^{th}$ sample of a designated set of probe signals can be set equal to the $(n-mD)^{th}$ component of the sequence of length S, with $(n-mD)$ being evaluated modulo S.

In yet another embodiment, the sequence of length S can be determined by selecting a partial set of transform components having arbitrary, non-zero, real number first and last partial set transform components and arbitrary, non-zero, complex number components for other than the first and last partial set transform components, adding the non-zero, complex number components to the partial set in reverse order and in complex conjugate to obtain a full set of S transform components and obtaining an inverse DFT of the full set of transform components. The transformed companion components can be obtained by taking inverses of the full set of transform components.

The correlation estimate can be obtained by obtaining a DFT of components of the output signals, multiplying corresponding components of the DFT of components of the output signals and the transformed companion components to obtain product components and computing the inverse DFT of the product components. The characteristic can be selected by setting a characteristic at a designated tap q for a designated system output k from a designated system input p to a correlation estimate at correlation lag (pD+q) corresponding to the $k^{th}$ component of the output response to the applied probe signals. The DFT's and inverse DFT's can be obtained by the use of a Fast Fourier Transform algorithm and an inverse Fast Fourier Transform algorithm, respectively.

In further embodiments, methods and computer programs for determining characteristics of a FIR system can include applying identical sets of probe signals to the FIR system to obtain output signals, where the probe signals can have probe components taken from a circulant matrix of a size at least equal to a result of a multiplication of a number of FIR system inputs and a response duration of the FIR system. The method can obtain product components based on multiplication of corresponding components of a DFT of components of the output signals and a DFT of companion components derived from a circulant inverse of the circulant matrix and the characteristics can be selected based on computing an inverse DFT of the product components.

In other embodiments, methods and computer programs can determine system characteristics of a FIR system by: selecting a partial set of transform components having arbitrary, non-zero, real number first and last partial set transform components and arbitrary, non-zero, complex number components for other than the first and last partial set transform components; adding the non-zero, complex number components to the partial set in reverse order and in complex conjugate to obtain a full set of transform components, the full set having a number of transform components at least equal to a multiple D of the number of inputs, the multiple D being at least equal to a response duration of the system. The method can obtain an inverse DFT of the full set of transform components to obtain a set of probe components and can apply a number of identical ones of the set of probe components to the FIR system to obtain output signals. The method can further obtain transformed companion components from inverses of the full set of transform components, obtain product components based on multiplication of corresponding components of a DFT of components of the output signals and the transformed companion components and select the characteristics based on computing an inverse DFT of the product components.

In still another embodiment, systems for determining characteristics of a FIR system can include means for inputting identical sets of probe signals to the FIR system, means for measuring output signals in response to the probe signals, means for determining transformed companion components related to components of the probe signals, means for obtaining a DFT of components of the output signals, means for multiplying corresponding components of the DFT of components of the output signals and the transformed companion components to obtain product components and means for selecting characteristics of the FIR system based on an inverse DFT of the product components.

In a further embodiment, a system can include means for selecting a partial set of transform components having arbitrary, non-zero, real number first and last partial set transform components and arbitrary, non-zero, complex number components for other than the first and last partial set transform components and means for adding the non-zero, complex number components to the partial set in reverse order and in complex conjugate to obtain a full set of transform components, the full set having a number of transform components at least equal to a multiple D of the number of inputs, the multiple D being at least equal to a response duration of the system. The system can include means for obtaining a set of probe components by taking an inverse DFT of the full set of transform components, means for obtaining output signals by applying a number of identical ones of the set of probe components to the FIR system and means for obtaining transformed companion components from inverses of the full set of transform components. The system can further include means for obtaining product components based on multiplication of corresponding components of a DFT of components of the output signals and the transformed companion components and means for selecting the characteristics based on computing an inverse DFT of the product components.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

Figure 1:
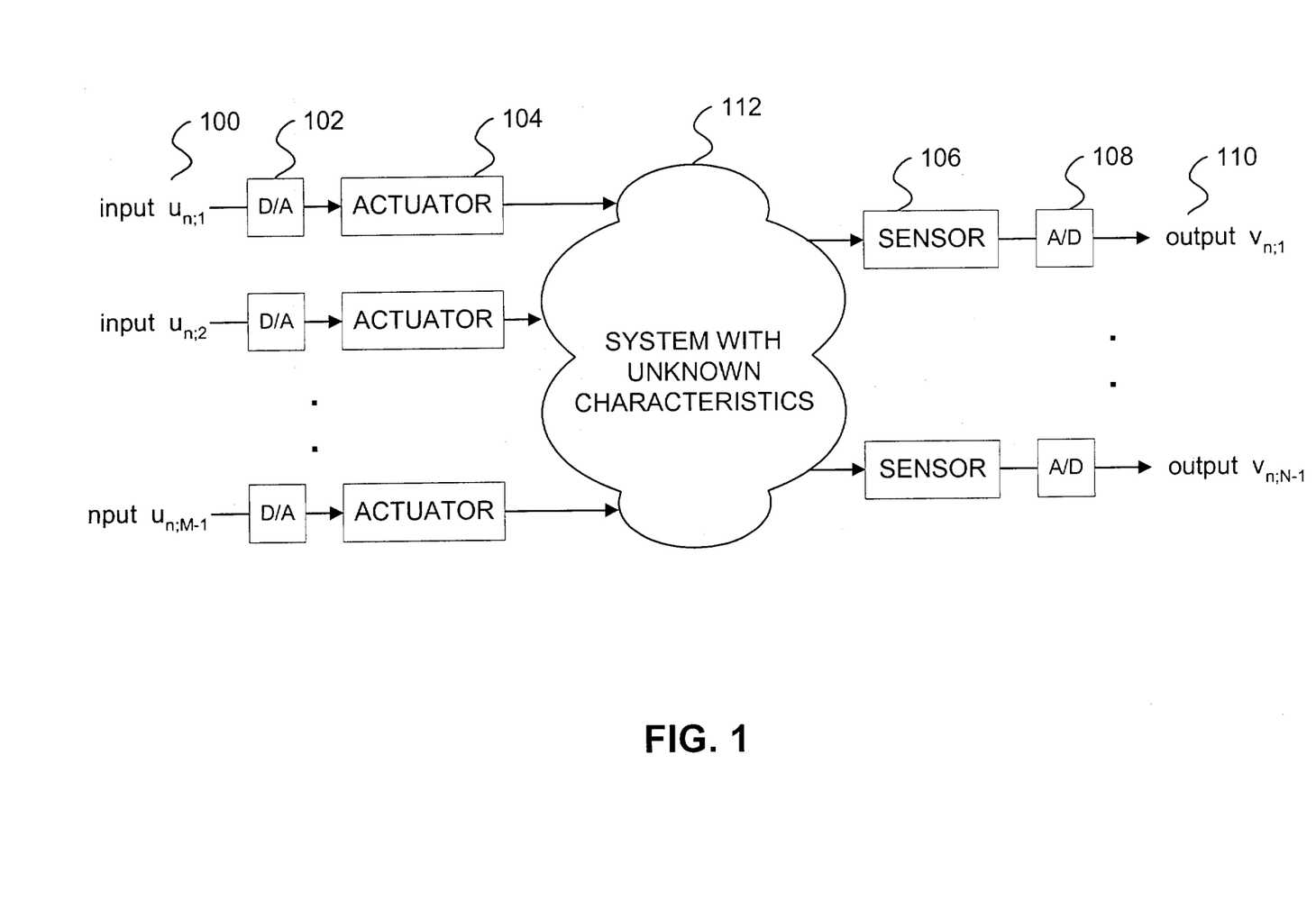
FIG. 1 shows a diagram illustrating inputs applied to a system and the resulting responses.

FIG. 1 depicts a system 112 having unknown characteristics. To determine the characteristics of the system 112, a collection of actuators 104 may operate on the system 112 in accordance with input signals 100 processed by digital-to-analog converters 102. As an example, the system 112 may be a structure operated upon by a set of actuators 104 that may amplify a converted input signal 100 and shake the structure at an intensity commensurate to the input signal 100. Because the digital-to-analog converters and amplifiers have practical range limitations, the level of the input signal 100 may be limited so as to avoid signal distortion or damage to the converters, amplifiers, or other components.

FIG. 1 also depicts sensors 106 that may monitor the response of the system 112 to the input 100. To continue the example, these sensors 106 can detect the vibrational response of the structure, or system 112, to shakers 104. As shown, these sensors 106 can feed analog/digital converters 108 that can convert these responses to digital signals 110.

By analyzing response 110 of system 112 to a given set of inputs 100, a relationship can be established between a given input 100 and a given output 110. One method to determine such relationships may be to apply a zero input signal 100 to all but one of the actuators 104, i.e., apply only one scalar input signal 100 to one of the actuators 104, and measure the responses 110 of the sensors 106 to the single non-zero input signal 100. This process can be repeated until the different input signals 100 have been applied. An approach, or method can be described herein that applies non-zero input signals 100 to multiple input channels 104 simultaneously. Such input signals 100 can be considered vector probe signals 100. The method can provide a low-cost method of SysId, in terms of computational requirements.

In greater detail, response 110 of system 112 to the inputs 100 can be modeled as the noise-corrupted output of a Finite Impulse Response (FIR) system. The input-output relationship of such a system can be compactly represented according to:

$$v_n = e_n + \sum_{l=0}^{T-1} B_l u_{n-l}, \qquad [1]$$

where $B_l$ can represent the matrix of unknown system coefficients for the $l^{th}$ tap; $e_n$ can represent the $n^{th}$ time sample of a vector-valued zero-mean noise process; and the input-output signals $u_n$ and $V_n$, respectively, can be observed in $K \geq 1$ equal-duration snapshots $W_k \equiv \{[u_n, v_n(k)]; n=0,1, \ldots, S-1$ for $k=0,1, \ldots, K-1$. The input signal, $u_n$, can be the same for each snapshot. Moreover, for some $D \geq T$, the input signal may be defined and applied for the entire time indicated by the index range $-D \leq n \leq S-1$. The output signals may be averaged over the snapshots $$\bar{v}_n = \frac{1}{K} \sum_{k=0}^{K-1} v_n(k) \qquad [2]$$

and $B_l$ can be estimated using $[u_n, \bar{v}_n]$ for $n=0,1, \ldots, S-1$. It can be understood that the averaging of the output signals may be used to improve the signal to noise ratio (SNR) of the output signal and the resulting fidelity of the estimates. However, if one snapshot can be applied at a sufficiently high level, the fidelity of the resulting estimate may be adequate, so that no additional snapshots may need to be applied and averaged, i.e., K=1.

The choice of input signals $u_n$ may include the use of a circulant matrix of probe components $$C = \begin{bmatrix} c_0 & c_1 & c_2 & \cdots & c_{S-1} \\ c_{S-1} & c_0 & c_1 & \cdots & c_{S-2} \\ c_{S-2} & c_{S-1} & c_0 & \cdots & c_{S-3} \\ \vdots & \vdots & \vdots & \ddots & \vdots \\ c_1 & c_2 & c_3 & \cdots & c_0 \end{bmatrix} \qquad [3]$$

and the companion components derived from circulant inverse $C^{-1} = \bar{C}$, where $$\bar{C} = \begin{bmatrix} \bar{c}_0 & \bar{c}_1 & \bar{c}_2 & \cdots & \bar{c}_{S-1} \\ \bar{c}_{S-1} & \bar{c}_0 & \bar{c}_1 & \cdots & \bar{c}_{S-2} \\ \bar{c}_{S-2} & \bar{c}_{S-1} & \bar{c}_0 & \cdots & \bar{c}_{S-3} \\ \vdots & \vdots & \vdots & \ddots & \vdots \\ \bar{c}_1 & \bar{c}_2 & \bar{c}_3 & \cdots & \bar{c}_0 \end{bmatrix}. \qquad [4]$$

the element in the $m^{th}$ row and $n^{th}$ column of $C$ and $\bar{C}$ can be expressed as $C_{m,n} = c_{n \ominus m}$ and $\bar{C}_{m,n} = \bar{c}_{n \ominus m}$, respectively, where $n \ominus m \equiv n-m \mod S$ for $n,m=0,1, \ldots, S-1$. Thus, $$\sum_{n=0}^{S-1} C_{m,n} \bar{C}_{n,\tau} = \sum_{n=0}^{S-1} c_{n \ominus m} \bar{c}_{\tau \ominus n} = \delta_{m,\tau}, \qquad [5]$$

where $\delta_{m,\tau}=1$ for $m=\tau$ and $\delta_{m,\tau}=0$ for $m \neq \tau$.

If $u_n$ can be taken to have $M$ components and $S \geq MD$, then, for $n=0,1, \ldots, S-1$ and $m=0,1, \ldots, M-1$, let $$u_{n;m} \equiv c_{n \ominus mD}, \qquad [6]$$

where $u_{n;m}$ can denote the $m^{th}$ component of $u_n$. If $\bar{v}_n$ may have $N$ components, the input-output relationship of Equation [1] can be rewritten as:

$$\bar{v}_{n;k} \equiv \bar{e}_{n;k} + \sum_{l=0}^{T-1} \sum_{m=0}^{M-1} B_{l;k,m} u_{n-l;m} \qquad [7]$$

for $n=0,1, \ldots, S-1$ and $k=0,1, \ldots, N-1$, where $B_{l;k,m}$ may be the element in the $k^{th}$ row and $m^{th}$ column of $B_l$, while $\bar{v}_{n;k}$ can denote the $k^{th}$ component of $\bar{v}_n$. Additionally, the use of a preamble sequence, which may be referred to as cyclically padding the probe signal, can place the unknown system in a known state at the beginning of each snapshot. The preamble sequence can be defined for $n=-D,-D+1, \ldots, -1$ by letting $u_n = u_{S+n}$ for $n=-D,-D+1, \ldots, -1$. For the exemplary embodiment described herein, the preamble sequence may cyclically pad the first of the sets of probe signals. However, it can be noted that the preamble sequence may be used to cyclically pad each of the sets of probe signals. Using the cyclically-padded circulant probe signal in Equation [7] can yield $$\bar{v}_{n;k} \equiv \bar{e}_{n;k} + \sum_{l=0}^{T-1} \sum_{m=0}^{M-1} B_{l;k,m} c_{n \ominus (mD+l)}, \qquad [8]$$

since $u_{n-l;m} = c_{(n-l) \ominus mD} = c_{n \ominus (mD+l)}$.

Correlations can be considered such that, for $\tau=0,1, \ldots, S-1$ and using Equation [5], $$\hat{R}(k, \tau) \equiv \sum_{n=0}^{S-1} \bar{v}_{n;k} \bar{c}_{\tau \ominus n} = \bar{\eta}_{\tau,k} + \sum_{l=0}^{T-1} \sum_{m=0}^{M-1} B_{l;k,m} \delta_{mD+l,\tau}, \qquad [9]$$

where $$\bar{\eta}_{\tau,k} \equiv \sum_{n=0}^{S-1} \bar{e}_{n;k} \bar{c}_{\tau \ominus n}. \qquad [10]$$

If $\tau=pD+q$ for some $p \in \{0,1, \ldots, M-1\}$ and some $q \in \{0,1, \ldots, T-1\}$, then Equation [9] can become $$\hat{R}(k, pD+q) = \bar{\eta}_{pD+q,k} + B_{q;k,p}, \qquad [11]$$

otherwise $\hat{R}(k,\tau) = \bar{\eta}_{\tau,k}$. Thus, it can be seen to be reasonable to use the parameter estimates $$\hat{B}_{q;k,p} = \hat{R}(k,pD+q) \qquad [12]$$

for $p \in \{0,1, \ldots, M-1\}$, $q \in \{0,1, \ldots, T-1\}$ and $k \in \{0,1, \ldots, N-1\}$.

It can be understood from the above that one can obtain estimates of the system parameters by computing the circular correlation $\hat{R}(k,\tau)$, as defined in Equation [9]. As previously noted, traditional methods of determining the system parameters can involve solving a linear system of equations using auto-correlations of the input signals and cross correlations between the input and output signals. For the method as described above, the parameter estimates can be obtained without the need to explicitly solve a system of equations.

The circular correlation $\hat{R}(k,\tau)$ can be computed using one of a multiple of techniques that may be known in the art. In a preferred embodiment, one can compute the parameter estimates $\hat{B}_{q;k,p}$ by considering the following transforms:

$$\tilde{v}_{m;k} = \sum_{n=0}^{S-1} \bar{v}_{n;k} e^{-2\pi i n m/S}; \quad [13]$$

and $$\tilde{c}_m = \sum_{n=0}^{S-1} \bar{c}_n e^{-2\pi i n m/S}, \quad [14]$$

for m=0,1, . . . ,S−1. Referring to Equation [9], it can be verified that $$\hat{R}(k,\tau) = S^{-1} \sum_{m=0}^{S-1} \tilde{c}_m \tilde{v}_{m;k} e^{2\pi i m \tau/S} \quad [15]$$

for τ=0,1, . . . ,S−1. Thus, for each k∈{0,1, . . . , N−1}, $\tilde{v}_{m;k}$ may be computed in accordance with Equation [13] using the known Fast Fourier Transform (FFT) algorithm, and $\tilde{c}_m \tilde{v}_{m;k}$ can be computed for each m=0,1, . . . , S−1. Then, $\hat{R}(k,\tau)$ can be computed in accordance with Equation [15] using the inverse FFT algorithm. The estimates can then be selected from these results, in accordance with Equation [12].

Figure 2:
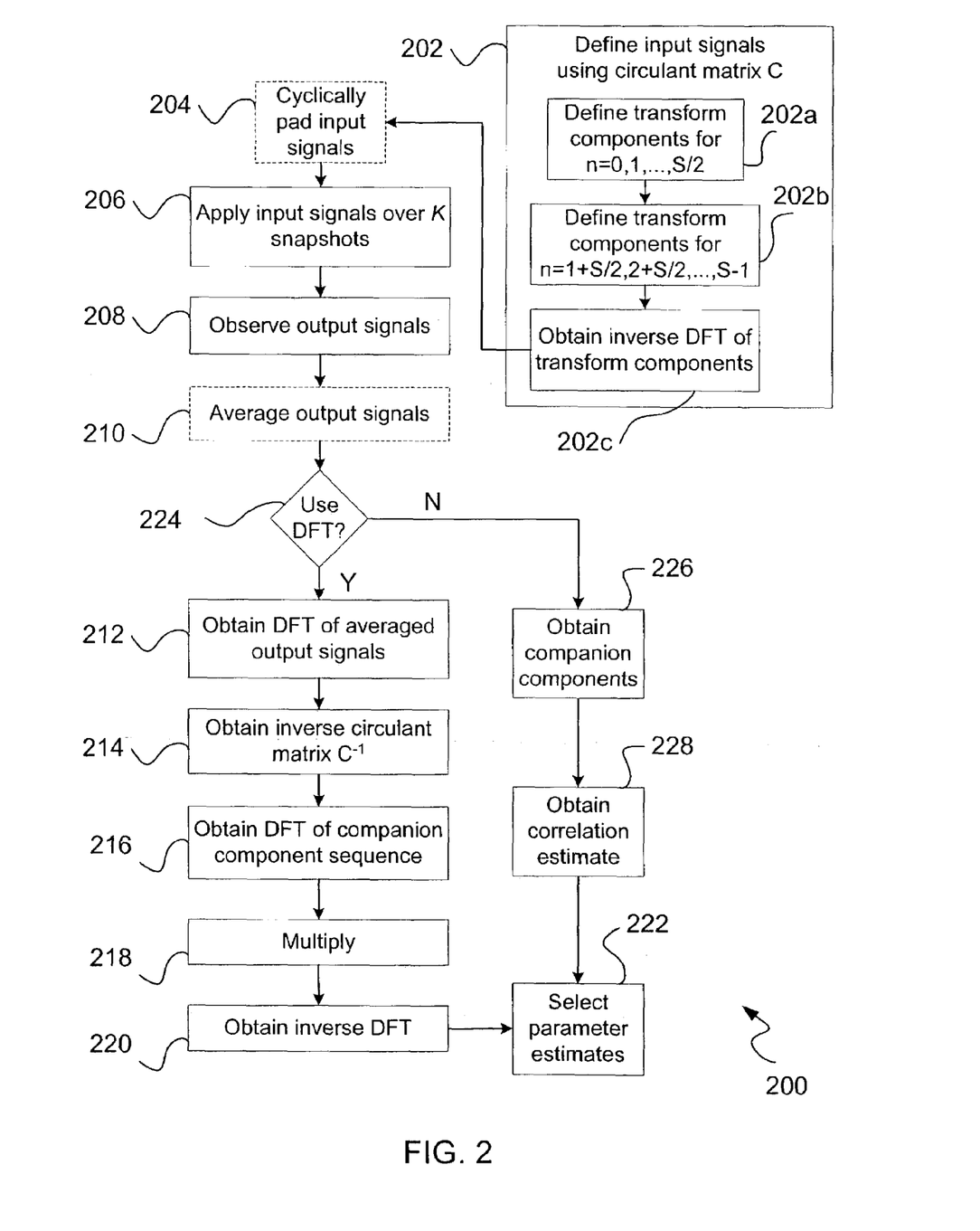
FIG. 2 shows a flowchart for determining the response characteristics of a system.

FIG. 2 can illustrate a process 200 for determining system response characteristics using the approach described above. Considering the input signals $u_n$ to have M components, $u_n$ may first be defined at 202, such that the $m^{th}$ component of $u_n$ can equal the $(n\ominus mD)^{th}$ component of a sequence $c_0, c_1, \ldots , c_{S-1}$, which determines an S×S circulant matrix C, where S≧MD, D≧T and (n⊖mD) can be evaluated as (n−mD) modulo S (Equation [6]). The input signals $u_n$ can be cyclically padded at 204 using a preamble sequence to place the unknown system in a known state at the beginning of each of a number K of equal duration snapshots. The preamble sequence can be defined for n=−D, −D+1, . . . ,−1 by letting $u_n = u_{S+n}$.

The input signals $u_n$ can then be applied to the system for the K equal duration snapshots at 206, and the output signals $v_n$ can be observed at 208. It can be noted that the input signal $u_n$ can be the same for each snapshot and, for some D≧T, may be defined and applied for the entire time indicated by the index range −D≦n≦S−1. Using Equation [2], the output signals can be averaged, at 210, over the number of snapshots K to obtain $\bar{v}_{n;k}$, where $\bar{v}_{n;k}$ can denote the $k^{th}$ component of averaged output signals $\bar{v}_n$. It can be understood, as previously noted, that only a single snapshot (K=1) may be required. Thus, 210 may be shown in phantom in FIG. 2 to indicate averaging may include simply using the observed output signals when only a single snapshot may be required. It may further be understood that the method described herein may be used without cyclically padding the input signals $u_n$. Thus, 204 may also be shown in phantom in FIG. 2 so as to indicate cyclically padding may not be required. When not cyclically padded, the system may be in an unknown state at the beginning of the unpadded snapshot. Thus, the $\bar{v}_{n;k}$ can contain terms that reflect noise outputs of the system that may be present with no input signal, as may be seen from Equations [7] and [8]. However, the effect of these terms may be negligible if KS>>T, or S>>T when no averaging is used, i.e., when K=1.

Using Equation [13], one can obtain $\tilde{v}_{m;k}$ for m=0,1, . . . ,S−1, i.e., the DFT of $\bar{v}_{n;k}$, by using the FFT algorithm at 212, for each k∈{0,1, . . . ,N−1}. The inverse of the circulant matrix C, i.e., $C^{-1}$, can be obtained at 214, with the companion component sequence $\bar{c}_0, \bar{c}_1, \ldots , \bar{c}_{S-1}$ taken from $C^{-1}$. Using Equation [14], and with $\bar{c}_n$ denoting the companion component sequence $\bar{c}_0, \bar{c}_1, \ldots , \bar{c}_{S-1}$, one may obtain $\tilde{c}_n$ for m=0,1, . . . , S−1, i.e., the DFT of $\bar{c}_n$, again by using the FFT algorithm at 216. Components $\tilde{v}_{m;k}$ of the transform of $\bar{v}_{n;k}$ can be multiplied at 218 with corresponding components $\tilde{c}_m$ of the transform of $\bar{c}_n$ to obtain product components $\tilde{c}_m \tilde{v}_{m;k}$ and Equation [15] can be used to obtain, at 220, the inverse DFT of these product components, also using the FFT algorithm. The parameter estimates, $\hat{B}_{q;k,p}$ of Equation [7], can then be selected at 222 from the result of 220 using Equation [12].

Alternatively, those of skill in the art may recognize that the correlation estimate $\hat{R}(k,\tau)$ can be obtained directly from Equation [9] using known techniques other than the discrete Fourier transforms described herein. For example, if one chooses not to use the discrete Fourier transforms, as determined at 224, the companion components can be determined at 226 as described previously with relation to obtaining the inverse circulant matrix $C^{-1}$. Using the averaged output signals $\bar{v}_{n;k}$ obtained at 210 and the companion components $\bar{c}_n$ obtained at 226, the correlation estimate can be obtained from Equation [9], as shown in 228. The parameter estimates can be selected (222) based on the correlation estimate so obtained.

It may also be understood that in defining the input signals at 202, the circulant matrix C need not be explicitly formed and that the inverse circulant matrix $C^{-1}$ need not be explicitly computed at 214. In practice, one can first select transform components $\tilde{c}_1, \tilde{c}_2, \ldots , \tilde{c}_{(S/2)-1}$ as arbitrary (non-zero) complex numbers and transform components $\tilde{c}_0, \tilde{c}_{S/2}$ as arbitrary (non-zero) real numbers (202a). Then one can define the transform components $\tilde{c}_n = \tilde{c}_{S-n}^*$, where $\tilde{c}_{S-n}^*$ denotes the complex conjugate of $\tilde{c}_{S-n}$ for n=1+S/2,2+S/2, . . . ,S−1 (202b), so that the inverse DFT of $\tilde{c}_0, \tilde{c}_1, \ldots , \tilde{c}_{S-1}$ (202c) can be the real sequence of probe components $c_0, c_1, \ldots , c_{S-1}$. Furthermore, the transformed companion sequence obtained at 216 can be obtained directly from $\tilde{\bar{c}}_0, \tilde{\bar{c}}_1, \ldots , \tilde{\bar{c}}_{S-1} = 1/\tilde{c}_0, 1/\tilde{c}_1, \ldots , 1\tilde{c}_{S-1}$, without explicitly computing the companion sequence $\bar{c}_0, \bar{c}_1, \ldots , \bar{c}_{S-1}$, though, if desired, the companion sequence $\bar{c}_0, \bar{c}_1, \ldots , \bar{c}_{S-1}$ (obtained at 214) can be computed as the inverse DFT of the transformed companion sequence $\tilde{\bar{c}}_0, \tilde{\bar{c}}_1, \ldots , \tilde{\bar{c}}_{S-1}$.

Figure 3:
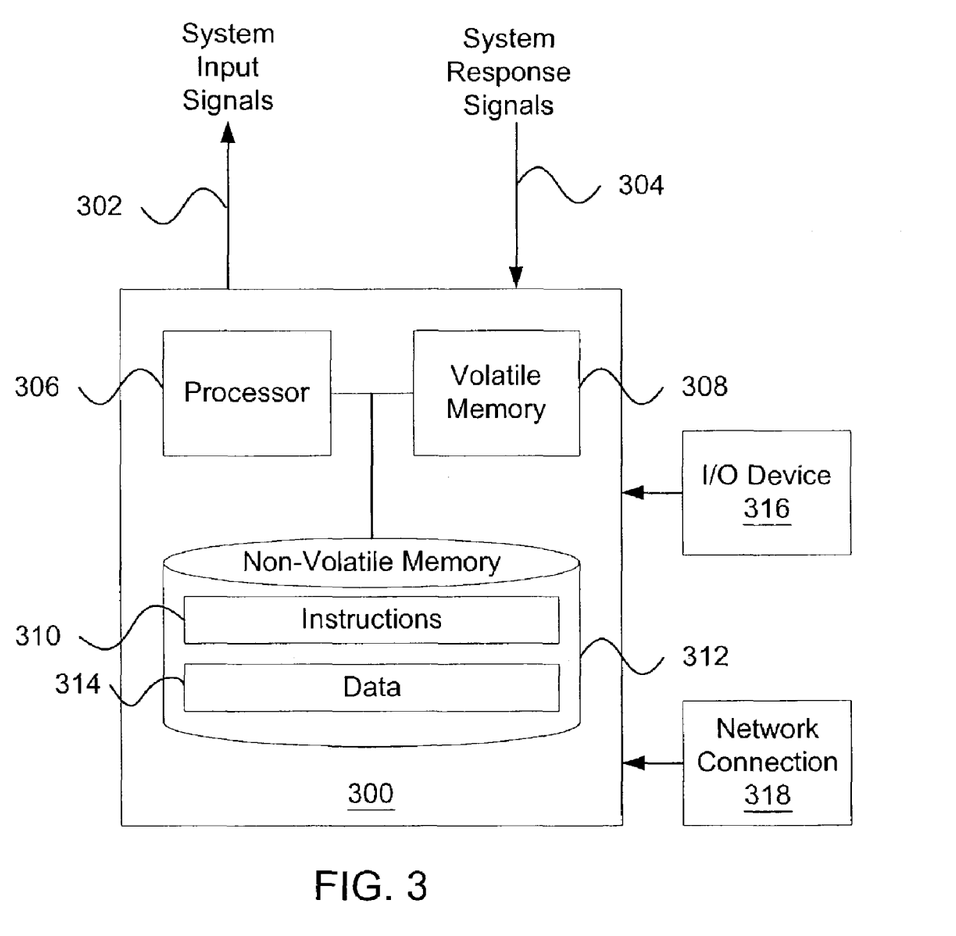
FIG. 3 shows a diagram of a computer platform suitable for determining response characteristics of a system.

The process 200 of FIG. 2 may be implemented by a processor controlled device. FIG. 3 illustrates a device 300 suitable for executing instructions 310 implementing the techniques described above. The device 300 may include a processor 306, volatile memory 308, and non-volatile memory 312. The memory 308, 312 may store data 314 corresponding to the input and output values and other intermediate computations.

The memory 312 may also include instructions 310. The instructions 310 can be transferred, in the course of operation, from the non-volatile memory 312 to the volatile memory 308 and processor 306 for execution. The instructions 310 may output system input values, as indicated at 302, and receive system output values, as indicated at 304, during system testing. The device 300 may communicate with a user via a monitor or other input/output device 316 such as a keyboard, mouse, microphone, and so forth. Additionally, the device 300 may feature a network connection 318.

The techniques described herein may not be limited to a particular hardware or software configuration; they may find applicability in many computing or processing environments. The techniques may be implemented in hardware or software, or a combination thereof. Preferably, the techniques are implemented in computer programs.

The computer programs may be implemented in high level procedural language (e.g., MATLAB®, The MathWorks, Inc., Natick, Mass.) or an object oriented programming language to communicate with a computer system. However, the programs can be implemented in assembly or machine language, if desired. In any case the language may be compiled or interpreted language.

The computer programs can be stored on a storage media or device(s) (e.g., CD-ROM, hard disk, or magnetic disk) that are readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Additionally, while described in conjunction with an example of a shaken physical structure, the approaches described may be applied to a wide variety of systems such as biological, signal processing, and so forth. Additionally, the spectrum of the circulant probe signal sequence $c_0, c_1, \ldots, c_{S-1}$ can be arbitrarily specified, subject only to the mild condition that the corresponding circulant matrix C must be non-singular, so that the probe energy can have any desired spectral distribution. This may be desirable if the observation noise may have a spectral distribution and/or certain spectral portions of the system 112 may be identified more accurately than others. Other embodiments are within the scope of the following claims.

What is claimed is:

1. A method of determining characteristics of a Finite Impulse Response (FIR) system having a number of inputs and at least one output, comprising:
    determining a snapshot having a duration S at least equal to a multiple D of the number of inputs, the multiple D being at least equal to a response duration of the FIR system;
    determining a number of identical sets of probe signals, probe components of the sets of probe signals being taken from a sequence of length S;
    applying at least one of the number of identical sets of probe signals to the FIR system to obtain output signals;
    obtaining transformed companion components related to the probe components;
    obtaining a correlation estimate based on components of the output signals and the transformed companion components; and
    selecting the characteristics from the correlation estimate.

2. The method of claim 1, wherein obtaining a correlation estimate comprises:
    averaging the output signals over the number of identical sets of probe signals applied so as to obtain averaged output signals; and
    obtaining the correlation estimate based on the averaged output signals.

3. The method of claim 2, comprising attaching a preamble sequence of a size equal to the multiple D to a first of the sets of probe signals.

4. The method of claim 3, comprising attaching the preamble sequence to each of the sets of probe signals.

5. The method of claim 4, comprising defining the preamble sequence such that the probe components of the preamble sequence correspond to the D last components of one of the sets of probe signals.

6. The method of claim 1, wherein obtaining the transformed companion components comprises:
    obtaining a discrete Fourier transform (DFT) of the sequence of length S; and
    obtaining the transformed companion components as an inverse of components of the DFT of the sequence of length S.

7. The method of claim 6, wherein obtaining the correlation estimate comprises:
    obtaining a DFT of components of the output signals;
    multiplying corresponding components of the DFT of components of the output signals and the transformed companion components to obtain product components; and
    computing an inverse DFT of the product components.

8. The method of claim 7, comprising using a Fast Fourier Transform (FFT) algorithm to obtain at least one of the DFT of components of the output signals and the DFT of the sequence of length S.

9. The method of claim 8 comprising using an inverse FFT algorithm to compute the inverse DFT of the product components.

10. The method of claim 7, wherein selecting the characteristics comprises setting a characteristic for a designated tap q of a designated system output k resulting from a designated system input p to a correlation estimate at correlation lag (pD+q) corresponding to a $k^{th}$ component of an output response to the applied probe signals.

11. The method of claim 7, wherein selecting a characteristic comprises setting a characteristic for a designated tap q of a designated system output k resulting from a designated system input p based on the relationship:

$$B_{q;k,p} \equiv \hat{R}(k, pD+q) = S^{-1} \sum_{m=0}^{S-1} \tilde{\tilde{c}}_m \tilde{v}_{m;k} e^{2\pi i m(pD+q)/S},$$

where R designates the correlation estimate, B is the characteristics, m is an integer, and $\tilde{v}_{m;k}$ and $\tilde{c}_m$ are the corresponding components of the DFT of components of the output signals and the transformed companion components, respectively.

12. The method of claim 1, comprising attaching a preamble sequence of a size equal to the multiple D to a first of the at least one set of probe signals.

13. The method of claim 1, comprising setting a designated probe component m of an $n^{th}$ sample of a designated set of probe signals equal to the $(n-mD)^{th}$ component of the sequence of length S, with (n−mD) being evaluated modulo S.

14. The method of claim 1, wherein the sequence of length S is determined by:
    selecting a partial set of transform components having arbitrary, non-zero, real number first and last partial set of transform components and arbitrary, non-zero, complex number components for other than the first and last partial set of transform components;
    adding the arbitrary non-zero, complex number components to the partial set of transform components in reverse order and in complex conjugate to obtain a full set of transform components, the full set having S transform components; and obtaining an inverse discrete Fourier transform (DFT) of the full set of transform components.

15. The method of claim 14, wherein obtaining the transformed companion components comprises taking inverses of the full set of transform components.

16. The method of claim 15, wherein obtaining the correlation estimate comprises:

obtaining a DFT of components of the output signals;

multiplying corresponding components of the DFT of components of the output signals and the transformed companion components to obtain product components; and computing an inverse DFT of the product components.

17. A method of determining characteristics of a Finite Impulse Response (FIR) system, comprising:

applying identical sets of probe signals to the FIR system to obtain output signals, the probe signals having probe components taken from a circulant matrix of a size at least equal to a result of a multiplication of a number of FIR system inputs and a response duration of the FIR system;

obtaining product components based on multiplication of corresponding components of a discrete Fourier transform (DFT) of components of the output signals and a DFT of companion components derived from a circulant inverse of the circulant matrix; and selecting the characteristics based on computing an inverse DFT of the product components.

18. The method of claim 17, comprising attaching a preamble sequence to the sets of probe signals, the probe components of the preamble sequence corresponding to the D last components of one of the sets of probe signals, D being at least equal to the response duration of the FIR system.

19. The method of claim 18, comprising averaging the output signals over the number of identical sets of probe signals applied so as to obtain the components of the output signals.

20. A method of determining characteristics of the Finite Impulse Response (FIR) system, comprising:

selecting a partial set of transform components having arbitrary, non-zero, real number first and last partial set of transform components and arbitrary, non-zero, complex number components for other than the first and last partial set of transform components;

adding the arbitrary non-zero, complex number components to the partial set of transform components in reverse order and in complex conjugate to obtain a full set of transform components, the full set having a number of transform components at least equal to a multiple D of the number of inputs, the multiple D being at least equal to a response duration of the FIR system;

obtaining an inverse discrete Fourier transform (DFT) of the full set of transform components to obtain a set of probe components;

applying a number of identical ones of the set of probe components to the FIR system to obtain output signals;

obtaining transformed companion components from inverses of the full set of transform components;

obtaining product components based on multiplication of corresponding components of a DFT of components of the output signals and the transformed companion components; and selecting the characteristics based on computing an inverse DFT of the product components.

21. The method of claim 20, comprising attaching a preamble sequence to the number of identical ones of the set of probe components, the probe components of the preamble sequence corresponding to the D last components of the set of probe components, D being at least equal to the response duration of the FIR system.

22. The method of claim 21, comprising averaging the output signals over the number of identical ones of the set of probe components applied so as to obtain the components of the output signals.

23. A system for determining characteristics of a Finite Impulse Response (FIR) system, comprising:

means for inputting identical sets of probe signals to the FIR system;

means for measuring output signals in response to the probe signals;

means for determining transformed companion components related to components of the probe signals;

means for obtaining discrete Fourier transforms (DFT) of components of the output signals;

means for multiplying corresponding components of the DFT of components of the output signals and the transformed companion components to obtain product components;

means for computing an inverse DFT of the product components; and means for selecting characteristics of the FIR system based on the inverse DFT of the product components.

24. A system for determining characteristics of the Finite Impulse Response (FIR) system, comprising:

means for selecting a partial set of transform components having arbitrary, non-zero, real number first and last partial set transform components and arbitrary, non-zero, complex number components for other than the first and last partial set transform components;

means for adding the arbitrary, non-zero, complex number components to the partial set in reverse order and in complex conjugate to obtain a full set of transform components, the full set having a number of transform components at least equal to a multiple of D of the number of inputs, the multiple D being at least equal to a response duration of the FIR system;

means for obtaining a set of probe components by taking an inverse discrete Fourier transform (DFT) of the full set of transform components;

means for obtaining output signals by applying a number of identical ones of the set of probe components to the FIR system;

means for obtaining transformed companion components from inverses of the full set of transform components;

means for obtaining product components based on multiplication of corresponding components of a DFT of components of the output signals and the transformed companion components; and means for selecting the characteristics based on computing an inverse DFT of the product components.

25. A computer-executable program tangibly stored on a computer-readable medium and operable to cause a computer to determine characteristics of a Finite Impulse Response (FIR) system having a number of inputs, the computer-executable program comprising computer-executable instructions to:

determine a duration S at least at least equal to a multiple D of the number of inputs of the FIR system, the multiple D being at least equal to a response duration of the FIR system;

determine a number of identical sets of probe signals having probe components taken from a circulant matrix of the size S×S;

apply at least one of the number of identical sets of probe signals to the FIR system to obtain output signals;

derive companion components of the probe components from a circulant inverse of the circulant matrix;

obtain a correlation estimate based on components of the output signals and the companion components; and select the characteristics from the correlation estimate.

26. The computer-executable program of claim 25, wherein the instructions to obtain a correlation estimate comprise instructions to:

obtain a discrete Fourier transform (DFT) of components of the output signals;

obtain transformed companion components from a DFT of the companion components;

multiply corresponding components of the DFT of components of the output signals and the transformed companion components to obtain product components; and compute an inverse DFT of the product components.

27. The computer-executable program of claim 26, comprising instructions to attach a preamble sequence to the sets of probe signals, the probe components of the preamble sequence corresponding to the D last components of one of the sets of probe signals.

28. The computer-executable program of claim 27, comprising instructions to average the output signals over the number of identical sets of probe signals applied so as to obtain the components of the output signals.

29. A computer-executable program tangibly stored on a computer-readable medium and operable to cause a computer to determine characteristics responses of a Finite Impulse Response (FIR) system, the computer-executable program comprising computer-executable instructions to:

select a partial set of transform components having arbitrary, non-zero, real number first and last partial set of transform components and arbitrary, non-zero, complex number components for other than the first and last partial set of transform components;

add the arbitrary non-zero, complex number components to the partial set of transform components in reverse order and in complex conjugate to obtain a full set of transform components, the full set having a number of transform components at least equal to a multiple D of the number of inputs, the multiple D being at least equal to a response duration of the FIR system;

obtain an inverse discrete Fourier transform (DFT) of the full set of transform components to obtain a set of probe components;

apply a number of identical ones of the set of probe components to the FIR system to obtain output signals;

obtain transformed companion components from inverses of the full set of transform components;

obtain product components based on multiplication of corresponding components of a DFT of components of the output signals and the transformed companion components; and select the characteristics based on computing an inverse DFT of the product components.

30. The computer-executable program of claim 29, comprising instructions to attach a preamble sequence to the number of identical ones of the set of probe components, the probe components of the preamble sequence corresponding to the D last components of the set of probe components, D being at least equal to the response duration of the FIR system.

31. The computer-executable program of claim 30, comprising instructions to average the output signals over the number of identical ones of the set of probe components applied so as to obtain the components of the output signals.

* * * * *